UNITED STATES PATENT OFFICE.

CARL RUDOLF LINKMEYER, OF BREMEN, GERMANY.

PROCESS OF MAKING SALTS OF HYDRATED CUPRIC OXID.

1,000,827.　　Specification of Letters Patent.　Patented Aug. 15, 1911.

No Drawing.　　Application filed December 10, 1909. Serial No. 532,445.

*To all whom it may concern:*

Be it known that I, CARL RUDOLF LINKMEYER, a subject of the German Emperor, and residing at Bremen, Germany, have invented a certain new and useful Improved Process of Manufacturing Salts of Hydrated Cupric Oxid, of which the following is a specification.

My invention relates to the production of salts of hydrated cupric oxid and a primary object is to provide an improved process of manufacturing salts of hydrated cupric oxid which are particularly suitable for dissolving cellulose.

Hydrated cupric oxid, which as is well known, is a very readily decomposable compound, decomposing into water ($H_2O$) and cupric oxid ($CuO$), is preferably used for making cupro-ammonium solutions for use as a solvent for cellulose. Pure hydrated cupric oxid is dissolved quite readily in ammonia, while cupric oxid, on the contrary, is dissolved with difficulty. Proceeding solely with the latter, even with equal percentages of ammonia, solutions poor in copper are always obtained even when the reaction continues for a long time. In view of the decomposability it is therefore readily understood that extending between chemically pure hydrated cupric oxid ($CuH_2O_2$) and cupric oxid ($CuO$), a series of intermediate products might arise which, with regard to their solubility in ammonia, all behave differently. When working on a large scale, (when for practical reasons sulfate of copper is generally used as the starting material in making the hydrate,) in spite of most careful preparation, employment of low temperatures during the precipitation, and so on, hydrated cupric oxids are always formed which leave something to be desired with regard to solubility and render necessary the employment of a considerable quantity of ammonia in excess. According to one known method 330 grams, according to another known method 300 grams, according to a third known method 191 grams and according to a fourth known method 148 grams of ammonia gas are requisite for dissolving 100 grams of cellulose.

Now I have found that I can produce a cupric oxid salt which, with regard to its more ready solubility in ammonia, excels all known methods, and which requires for its own solution and for dissolving the cellulose so little ammonia that the quantity of pure ammonia ($NH_3$) is even below the quantity by weight of the cellulose which is to be dissolved, so that as compared with the first above-mentioned known method about 70%, and as compared with the fourth above-mentioned known method about 40% less ammonia is required for dissolving the same quantity of cellulose. Such a readily soluble cupric oxid is obtained when simultaneously with the incomplete conversion of a cupric salt a quantity of carbonic acid is added to the solution. For example, proceeding with sulfate of copper I add only so much caustic lye that a mixture of copper hydrate and basic copper sulfate is formed simultaneously, and, by adding bicarbonate of an alkali metal copper carbonate is also formed. Free carbonic acid or a carbonate salt, the acid of which will readily part with its base, show the same effect as for instance bicarbonate of sodium, the carbonic acid being the agent responsible for the formation of a copper hydroxid which is readily soluble in ammonia.

Artificial lowering of the temperature or diminution of the heat reaction is not necessary in the process according to my invention, either when precipitating the hydrate or when dissolving the cellulose, and this is a great technical advance, and an important saving of ammonia, which is for the most part lost during the manufacture of artificial threads or filaments by means of precipitating lyes, on account of its volatility.

Example: 370 grams of powdered copper sulfate ($CuSO_4 5H_2O$) are dissolved in two liters of water; then 175 c. cms. caustic soda lye of 40° Baumé are taken and of this 130 c. cms. diluted with 1500 c. cms. water are added to the sulfate. Hereupon 25 grams of bicarbonate of soda dissolved in water are added and then the remaining 45 c. cms. of the soda lye diluted with 500 c. cms. of water. The liquid is now separated from the precipitate of copper which is obtained, and in order to be able to do this more readily by squeezing, 200 grams of finely cut cellulose may now be added. The hydrated cupric oxid unites loosely with the cellulose. The pulp consisting of cellulose and the copper precipitate, squeezed as dry as possible into a cake, is now worked up with 600 c. cms. of ammonia of specific gravity 888, equal to 173 grams of ammonia ($NH_3$), to a homogeneous paste, and for neutralizing the carbonic acid and basic sulfate 48 c. cms.

caustic soda lye in addition are added, complete dissolution occurring at once. In this manner 15 per cent. spinning solutions are readily obtained which are particularly suitable for manufacturing artificial threads, filaments and the like, the solutions being exceedingly viscous and tenacious, in consequence of the low percentage of ammonia and high percentage of cellulose, and directly precipitating cellulose structures with considerably weaker precipitants than other solutions.

For manufacturing especially strong and elastic artificial filaments, threads and the like, materials have recently been used which contain, besides cellulose, other substances of vegetable origin, such as dextrin, sugars, gums, etc., as described in my application Serial No. 486,572, filed March 29, 1909. My hereindescribed process is also suitable for these materials and solutions.

I claim—

1. The hereindescribed process of manufacturing mixtures, containing hydrated cupric oxid readily soluble in ammonia, which consists in forming from a solution of copper salt by means of a suitable base a mixture containing hydrated cupric oxid and a basic salt of copper in suspension, in adding to the mixture carbonic acid, and in finally converting any copper compounds, other than hydrate present, into said hydrate by means of a suitable base.

2. The hereindescribed process of manufacturing mixtures containing hydrated cupric oxid readily soluble in ammonia, which consists in dissolving copper sulfate in water, in adding diluted caustic soda lye thereto, and in then adding an aqueous solution of bicarbonate of soda and subsequently additional diluted soda lye thereto, whereby a precipitate of hydrated cupric oxid is obtained.

3. The process of manufacturing mixtures containing hydrated cupric oxid readily soluble in ammonia, which comprises dissolving copper sulfate in water, adding thereto a dilute solution of caustic alkali, then adding a bi-carbonate of an alkali metal, and finally adding an additional quantity of a dilute solution of caustic alkali.

In testimony whereof, I affix my signature in the presence of two witnesses.

CARL RUDOLF LINKMEYER.

Witnesses:
 WILHELM DRESING,
 T. POPPE.